US012323647B2

(12) United States Patent
Liang et al.

(10) Patent No.: US 12,323,647 B2
(45) Date of Patent: Jun. 3, 2025

(54) VIDEO QUALITY MONITORING SYSTEM

(71) Applicant: AVAGO TECHNOLOGIES INTERNATIONAL SALES PTE. LIMITED, Singapore (SG)

(72) Inventors: Victor Kai-Chieh Liang, Lake Forest, CA (US); Iue-Shuenn Chen, San Diego, CA (US); Rajesh Shankarrao Mamidwar, San Diego, CA (US); Xuemin Chen, Rancho Santa Fe, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 24 days.

(21) Appl. No.: 18/507,014

(22) Filed: Nov. 10, 2023

(65) Prior Publication Data

US 2025/0159271 A1    May 15, 2025

(51) Int. Cl.
*H04N 21/24*    (2011.01)
*H04L 65/80*    (2022.01)
*H04N 21/442*    (2011.01)
*H04N 21/466*    (2011.01)

(52) U.S. Cl.
CPC ......... *H04N 21/2408* (2013.01); *H04L 65/80* (2013.01); *H04N 21/44209* (2013.01); *H04N 21/466* (2013.01)

(58) Field of Classification Search
CPC ................ H04L 65/80; H04N 21/2408; H04N 21/44209; H04N 21/466
See application file for complete search history.

(56) References Cited

U.S. PATENT DOCUMENTS

| | | | | |
|---|---|---|---|---|
| 4,570,232 A | * | 2/1986 | Shikano | G10L 15/12 704/241 |
| 5,598,557 A | * | 1/1997 | Doner | G06F 16/3346 707/999.005 |
| 6,085,160 A | * | 7/2000 | D'hoore | G10L 15/005 704/277 |
| 6,186,834 B1 | * | 2/2001 | Arnett | H01R 13/6467 439/676 |
| 6,188,987 B1 | * | 2/2001 | Fielder | H04N 21/4342 704/229 |

(Continued)

*Primary Examiner* — Michael B. Pierorazio

(57) ABSTRACT

A device is provided that includes computer-readable storage media storing one or more sequences of instructions and processing circuitry configured to execute the one or more sequences of instructions. Upon executing the instructions, the processing circuitry may receive a plurality of network packets containing content encapsulated in a plurality of layers; process the received plurality of network packets to extract the content for presentation; generate a predicted presentation quality indicator for the extracted content using a plurality of machine learning models in a hierarchical order with data generated during processing of the received plurality of network packets used as inputs to the plurality of machine learning models; and provide the predicted presentation quality indicator for the extracted content to a server via a network, wherein the data generated during processing of the received plurality of network packets is correlated across the plurality of layers to generate the predicted presentation quality indicator.

20 Claims, 12 Drawing Sheets

(56) References Cited

U.S. PATENT DOCUMENTS

| | | | | |
|---|---|---|---|---|
| 6,442,518 B1* | 8/2002 | Van Thong | G10L 15/26 | 704/235 |
| 6,473,778 B1* | 10/2002 | Gibbon | G06F 40/103 | 715/201 |
| 7,047,191 B2* | 5/2006 | Lange | G10L 15/26 | 704/235 |
| 7,065,524 B1* | 6/2006 | Lee | G16H 50/50 | 706/45 |
| 7,092,888 B1* | 8/2006 | McCarthy | G10L 15/1822 | 704/277 |
| 7,509,385 B1* | 3/2009 | Rittmeyer | G06Q 10/107 | 715/224 |
| 7,729,917 B2* | 6/2010 | Miyamoto | G10L 15/22 | 704/275 |
| 7,739,253 B1* | 6/2010 | Yanovsky | G06F 16/9535 | 707/706 |
| 7,801,910 B2* | 9/2010 | Houh | G06F 16/583 | 707/765 |
| 7,962,331 B2* | 6/2011 | Miller | G10L 15/193 | 704/235 |
| 8,121,432 B2* | 2/2012 | Dorai | G06F 16/7844 | 382/276 |
| 8,131,545 B1* | 3/2012 | Moreno | G10L 15/04 | 704/235 |
| 8,423,363 B2* | 4/2013 | Gupta | G10L 15/22 | 704/251 |
| 8,572,488 B2* | 10/2013 | Phillips | G06F 3/0482 | 715/716 |
| 11,785,278 B1* | 10/2023 | Stone | H04N 21/8547 | 348/564 |
| 2002/0055950 A1* | 5/2002 | Witteman | G06F 16/40 | 707/E17.009 |
| 2002/0093591 A1* | 7/2002 | Gong | H04N 21/2368 | 348/E7.063 |
| 2003/0025832 A1* | 2/2003 | Swart | H04N 21/4828 | 348/E7.071 |
| 2003/0061028 A1* | 3/2003 | Dey | G06F 16/40 | 704/9 |
| 2003/0169366 A1* | 9/2003 | Lenzi | H04N 7/10 | 348/461 |
| 2003/0206717 A1* | 11/2003 | Yogeshwar | G11B 27/10 | 386/328 |
| 2004/0096110 A1* | 5/2004 | Yogeshwar | G06F 16/51 | 707/E17.031 |
| 2005/0227614 A1* | 10/2005 | Hosking | H04N 7/165 | 455/3.06 |
| 2006/0015339 A1* | 1/2006 | Charlesworth | G10L 15/187 | 704/E15.02 |
| 2006/0248073 A1* | 11/2006 | Jones | G06F 16/3328 | 707/999.005 |
| 2007/0011012 A1* | 1/2007 | Yurick | G10L 15/26 | 704/277 |
| 2007/0124147 A1* | 5/2007 | Gopinath | G10L 15/19 | 704/E15.021 |
| 2007/0124756 A1* | 5/2007 | Covell | G06F 16/635 | 348/E7.071 |
| 2007/0124788 A1* | 5/2007 | Wittkoter | H04N 7/165 | 348/E7.071 |
| 2007/0214164 A1* | 9/2007 | MacLennan | G06F 16/90 | |
| 2008/0066138 A1* | 3/2008 | Bishop | G06F 40/58 | 725/137 |
| 2008/0166106 A1* | 7/2008 | Ozawa | H04N 21/8113 | 386/245 |
| 2008/0232763 A1* | 9/2008 | Brady | H04N 21/44209 | 375/E7.076 |
| 2008/0255844 A1* | 10/2008 | Wu | G10L 15/193 | 704/E15.022 |
| 2008/0266449 A1* | 10/2008 | Rathod | H04N 21/8133 | 348/E7.001 |
| 2008/0270134 A1* | 10/2008 | Miyamoto | H04N 7/0885 | 348/E7.001 |
| 2009/0171662 A1* | 7/2009 | Huang | G10L 15/1822 | 704/E15.041 |
| 2010/0091187 A1* | 4/2010 | Topiwalla | H04N 21/4355 | 348/E7.003 |
| 2010/0299448 A1* | 11/2010 | Cuoq | H04L 65/80 | 709/234 |
| 2011/0022386 A1* | 1/2011 | Gatzke | G10L 15/26 | 704/235 |
| 2011/0040559 A1* | 2/2011 | Kim | G10L 21/055 | 704/271 |
| 2012/0101817 A1* | 4/2012 | Mocenigo | G10L 15/063 | 704/E15.001 |
| 2012/0253799 A1* | 10/2012 | Bangalore | G10L 15/183 | 704/E15.001 |
| 2013/0016770 A1* | 1/2013 | Kishigami | H04N 19/152 | 375/E7.154 |
| 2015/0304709 A1* | 10/2015 | Zhang | H04N 21/64322 | 725/109 |
| 2016/0007054 A1* | 1/2016 | Polumbus | G11B 27/10 | 725/116 |
| 2016/0234549 A1* | 8/2016 | Ducloux | H04N 21/4424 | |
| 2018/0109819 A1* | 4/2018 | Lu | H04N 21/2387 | |
| 2019/0215729 A1* | 7/2019 | Oyman | H04L 65/1016 | |
| 2020/0100041 A1* | 3/2020 | Kadri | G06F 3/165 | |
| 2021/0037281 A1* | 2/2021 | Xian | H04N 21/43637 | |
| 2023/0232065 A1* | 7/2023 | Yang | H04N 21/440281 | 725/86 |

* cited by examiner

VIDEO QUALITY MONITORING SYSTEM

TECHNICAL FIELD

The present description relates in general to video networks including, for example, video quality analytics across networks.

BACKGROUND

Video networks may stream content to millions of viewers scattered across geographically diverse locations. Maintaining the quality of the streamed content across the network is crucial to providing a consistent and good user experience. Traditionally, picture quality for video content may be assessed by comparing reference pictures from video content against corresponding pictures from the video content after traversing the network to users' locations. While this approach may be feasible for limited circumstances in which problems have been discovered and flagged, comparing delivered video content to reference video content presents logistical and resource issues.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

Human perception of image quality being either good or bad is relatively straight forward. However, trying to replicate human perception using machine analysis of image data is not as straight forward. Typically, machine analysis of image data involves comparing an instance of an image with a reference image and computing the differences between the two images using reference metrics such as Mean Square Error (MSE). The ability to mimic human perception of images to some degree without requiring comparisons against reference images is very appealing especially to operators of large-scale video networks.

The subject technology provides solutions that facilitate monitoring and rating the presentation of content, such as video content, across a network by leveraging machine learning models to predict the quality of content being presented to a user after traversing the network. According to aspects of the subject technology, an end-to-end video analytics system may be provided that integrates intelligent detection capabilities within edge devices of the network. Edge devices include customer premises equipment such as set-top boxes, smart televisions, modems, routers, etc. The subject technology does not limit the application of machine learning models to the analysis of low-level data such as image artifacts in decoded image data. Rather, the solutions provided by the subject technology extend across domains and protocols involved in the delivery and presentation of content. For example, machine learning models may be used in the analysis of IP (Internet Protocol), MPEG (Moving Picture Experts Group) transports, video and audio bitstreams, pixels, symbols, and metadata to track key quality and performance indicators. Data collected at the edge can be analyzed at the edge and/or sent to a server such as a cloud server for processing. The ability to analyze the data at the edge and limit communications with a central office to results and/or critical portions of the data frees up network bandwidth for content delivery rather than analysis traffic. Examples and descriptions of the subject technology are provided in detail below.

Figure 1:
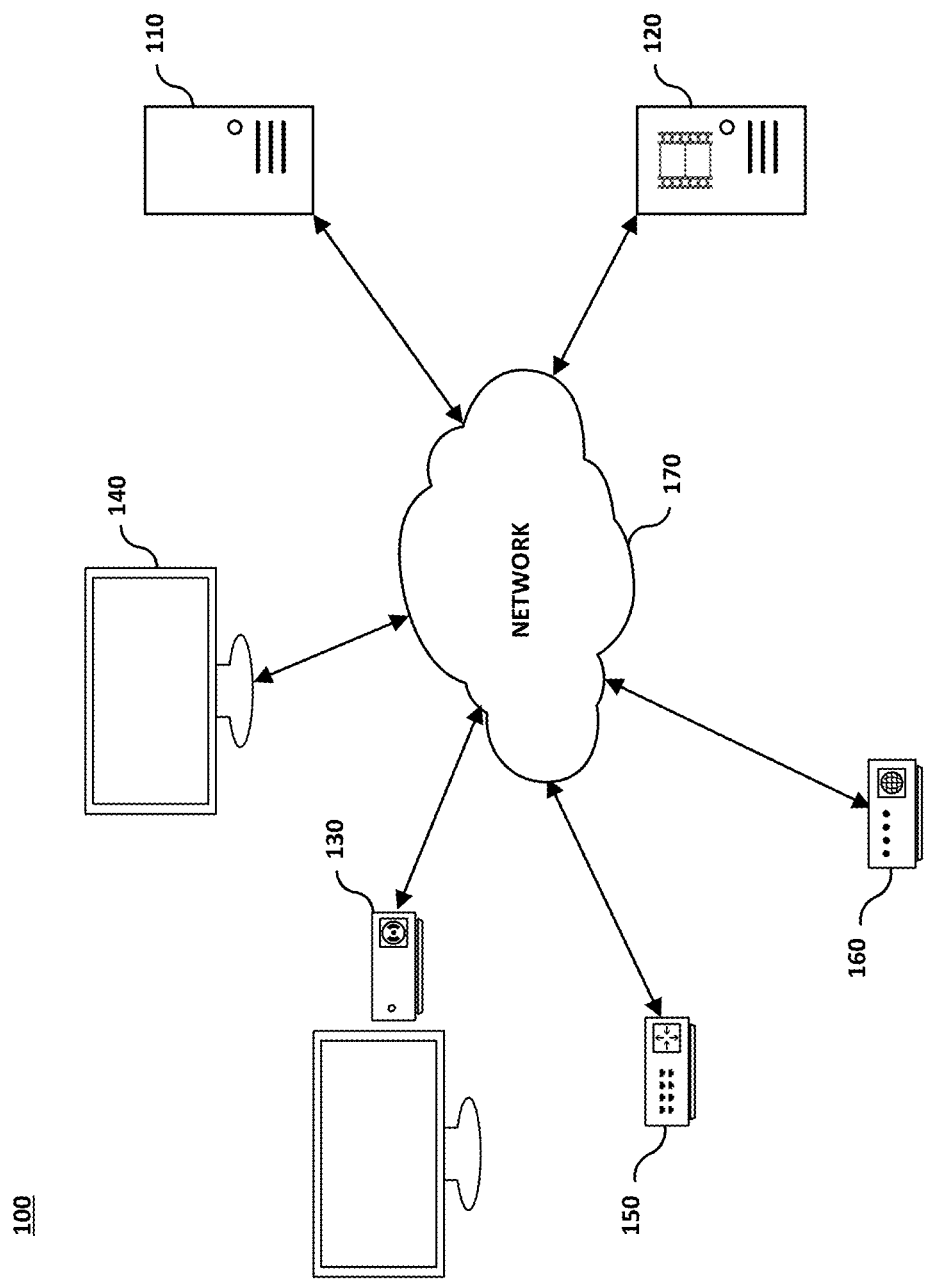
FIG. 1 illustrates an example of a network environment in which aspects of the subject technology may be implemented.

FIG. 1 illustrates an example of a network environment 100 in which aspects of the subject technology may be implemented. Not all of the depicted components may be required, however, and one or more implementations may include additional components not shown in the figure. Variations in the arrangement and type of the components may be made without departing from the spirit or scope of the claims as set forth herein. Depicted or described connections and couplings between components (including electrical and communicative connections and couplings) are not limited to direct connections or direct couplings and may be implemented with one or more intervening components unless expressly stated otherwise.

The example network environment 100 includes head end video quality monitor (HE-VQM) server 110, content server 120, customer premises equipment (CPE) 130-160, and network 170. CPE 130-160 include, but are not limited to, set-top box (STB) 130, smart television (TV) 140, router 150, and modem 160. HE-VQM server 110 and content server 120 may be configured to communicate with CPE 130-160 via network 170. Network 170 may include one or more public communication networks (such as the Internet, cable distribution networks, cellular data networks, etc.) and/or one or more private communications networks (such as private local area networks (LAN), leased lines, etc.). Network 170 may also include, but is not limited to, any one or more of the following network topologies, including a bus network, a star network, a ring network, a mesh network, a star-bus network, a tree or hierarchical network, and the like. In one or more implementations, network 170 may include transmission lines, such as coaxial transmission lines, fiber optic transmission lines, or generally any transmission lines, that communicatively couple HE-VQM server 110 and content server 120 to CPE 130-160. HE-VQM server 110 and content server 120 may communicate with CPE 130-160 via the same network connections or via different respective network connections.

HE-VQM server 110 and content server 120 may be co-located at a video central office (e.g., a facility containing equipment configured for receiving and processing content from various sources for distribution to customer premises) of a cable operator or some other type of content distributor or may be located at different respective locations. HE-VQM server 110 and content server 120 may be implemented together on a common server or may be implemented in separate respective servers. In addition, HE-VQM 110 and/or content server 120 may be implemented using a single computing device or may be implemented using multiple computing devices configured to work together to perform their respective functions (e.g., cloud computing system, distributed system, etc.).

Figure 2:
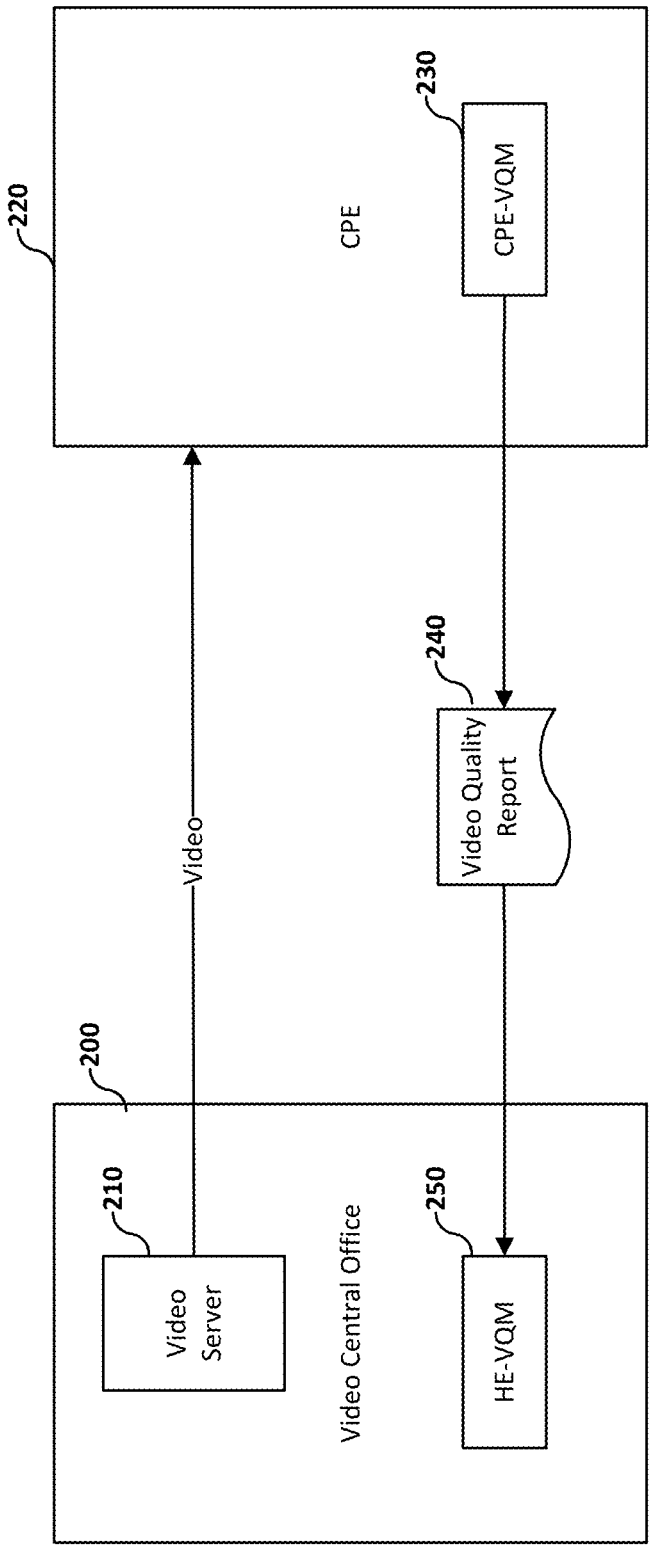
FIG. 2 is a block diagram illustrating the general operations of a video quality monitoring system according to aspects of the subject technology.

Briefly, content server 120 may be configured to communicate with CPE 130-160 to deliver content such as video content, audio content, data, etc. as a stream of network packets via network 170. As discussed in more detail below, CPE 130-160 may include CPE video quality monitors (VQM) that are configured to analyze or evaluate content delivered by content server 120 and generate presentation quality indicators estimating the quality of the presentation of that content to a consumer of the content. Reports including the presentation quality indicators may be provided to HE-VQM 110 via network 170 for further analysis either individually or collectively with reports received from other CPEs. FIG. 2 is a block diagram illustrating an example of the general operations of a video quality monitoring system according to aspects of the subject technology. As depicted in FIG. 2, video server 210 of video central office 200 provides video in a stream of network packets to CPE 220. In addition to presenting the video to a user of CPE 220, CPE 220 includes CPE-VQM 230 which evaluates the video content delivered from video server 210 and generates video quality report 240 which includes data estimating the quality of the presentation of the video data to the user. CPE-VQM 230 may provide video quality report 240 to HE-VQM 250 for system-wide evaluation.

Figure 3:
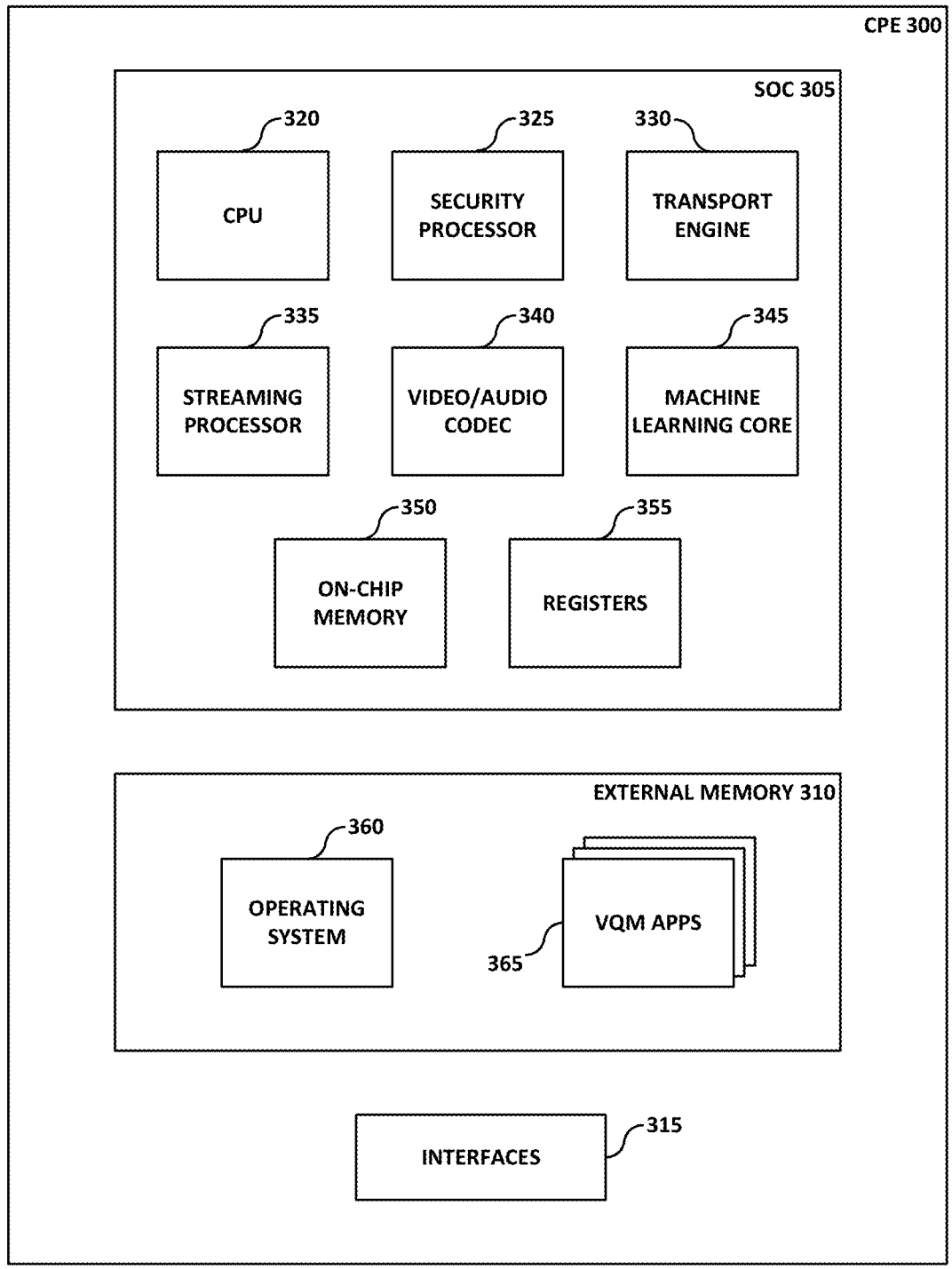
FIG. 3 is a block diagram illustrating components of consumer premises equipment according to aspects of the subject technology.

FIG. 3 is a block diagram illustrating components of a CPE, such as CPE 130 depicted in FIG. 1 and CPE 220 depicted in FIG. 2, according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections and couplings between components (including electrical and communicative connections and couplings) are not limited to direct connections or direct couplings and may be implemented with one or more intervening components unless expressly stated otherwise.

In the example depicted in FIG. 3, CPE 300 includes system-on-chip (SOC) 305, external memory 310, and interfaces 315. Interfaces 315 may include suitable circuitry, logic, and/or code that enable the communication of network packets with CPE 300. The subject technology is not limited to any particular network protocols and/or configurations. CPE 300 may include a single interface through which all communication of network packets is executed. Alternatively, CPE 300 may include multiple interfaces 315 of the same type or different respective types to facilitate communication with different entities such as different servers and/or other network devices.

According to aspects of the subject technology, SOC 305 may include central processing unit (CPU) 320, security processor 325, transport engine 330, streaming processor 335, video/audio codec 340, machine learning core 345, on-chip memory 350, and registers 355. SOC 305 and its components, either individually or collectively as groups of two or more components, represent processing circuitry configured to execute operations described herein. SOC 305, or one or more of the components of SOC 305, may be implemented in hardware using circuitry such as Application Specific Integrated Circuits (ASIC), Field Programmable Gate Arrays (FPGA), Programmable Logic Devices (PLD), controllers, state machines, gated logic, discrete hardware components, or any other suitable devices. One or more components of SOC 305 (e.g., streaming processor 335) may include or may be implemented using software/firmware (e.g., instructions, code, subroutines, etc.) that is executed by processing circuitry (e.g., CPU 320) to provide the operations described herein.

CPU 320 may include suitable logic, circuitry, and/or code that enable processing data and/or controlling operations of CPE 300. In this regard, CPU 320 may be configured to provide control signals to various other components of CPE 300. CPU 320 also may control transfers of data between components within CPE 300 and between CPE 300 and other devices or systems outside of CPE 300.

Security processor 325 may include suitable logic, circuitry, and/or code that enables the management of a secure content pipeline for protected content such as premium video content. Management of the secure content pipeline may include the encryption/decryption of protected content. Security processor 325 may work with other components of SOC 305 to securely handle protected content. While not depicted in FIG. 3, SOC 305 may include a secure CPU for executing operations involving protected content as well as secure registers and secure portion of on-chip memory for use during processing of the protected content. Other components of SOC 305 may recognize protected content being processed and use the secure registers and secure on-chip memory instead of openly accessible storage locations within SOC 305 and external to SOC 305.

Transport engine 330 may include suitable logic, circuitry, and/or code that manages and monitors the communication of network packets sent and received by CPE 300. Network packets may be sent and received using a number of different transport protocols including, but not limited to, Moving Pictures Experts Group (MPEG) transport protocol and/or an Internet Protocol (IP) transport protocol. While managing the transport of network packets, transport engine 330 may be configured to extract/capture and make available various delivery indicators that may be used in aspects of the video quality monitoring system described herein. For example, MPEG content delivery losses may be detected through audio and video packet identifier (PID) counter discontinuities. Other MPEG delivery indicators may include video buffers errors (overflows, underflows), program clock reference (PCR) values out-of-range, PCR discontinuities, etc. One example indicator is payload integrity failure count, which tracks if packet payloads can be parsed correctly. A failed integrity check indicates that the packet payload cannot be parsed correctly. Therefore, the payload data will not be decoded subsequently by the decoders. As a result, dark screens and service disruption are expected. The payload integrity may fail for many reasons such as data damage during delivery or an invalid security key being used for decrypting protected video content.

Similarly, various IP transport indicators may be extracted/captured and made available for purposes of monitoring presentation quality. Such indicators may include network jitter measured by inter-packet arrival times in one or both of the time and frequency domains, transmission patterns measured by the number of packets per unit time and the length of the packets, and flow characteristics measured by duration, size, and/or byte value distribution, for example.

Video/audio codec 340 may include suitable logic, circuitry, and/or code that enables decoding of content from received streams. The subject technology is not limited to any particular type of encoding/decoding standard and may use a variety of coding standards. For example, video data may be encoded/decoded using H.264, H.265, H.266, VP9, AV1, etc., and audio data may be encoded/decoded using AC3, AAC, He-AAC, MP3, WAV, etc. The subject technology may be configured to monitor data generated during the decoding of video and audio data for use as indicators of possible issues with the decoding and presentation of video/audio content. For example, video decodability may be tracked by counting how many pictures failed to be decoded. Note that some decodable pictures may be decoded with errors, with the balance being decoded without errors. The pictures decoded with errors may be tracked by frame type (e.g., I-frames, P-frames, and B-frames). The subject technology also may track decoder performance. For example, performance indicators such as current frame decode time, average frame decode time, and maximum frame decode time may be tracked to identify decoder issues versus delivery issues.

Streaming processor 335 may include suitable logic, circuitry, and/or code that enables the coordination of streaming operations performed by components of SOC 305 and the gathering/extraction of data generated during the processing of received content for use in various aspects of the subject technology. For example, streaming processor 335 may be configured to format and/or store data generated during the processing of received content in internal and/or external memory locations for use in monitoring presentation quality of the content.

Machine learning core 345 may include suitable logic, circuitry, and/or code that enables the operation of machine learning models such as neural networks for use during the monitoring of presentation quality. Machine learning core 345 may include the framework for implementing one or more models according to aspects of the subject technology. A model may be the result of a machine learning architecture trained using one or more datasets and defined by a set of parameters that may specify node operations and edge weights in the case of a neural network model. Machine learning core 345 also may include frameworks for other types of mathematical algorithms used as models. The models may be used to process various types of data associated with the processing and presentation of content. For example, high-level or semantic data such as program and channel information associated with the content may be extracted during processing by transport engine 330 and/or streaming processor 335 and used as inputs for a model. In addition, more complicated lower, signal level data such as picture pixels and/or audio symbols may be processed using trained neural network models. While the implementation of models has been described as using machine learning core 345, the subject technology also may implement one or more models using CPU 320 executing one or more sequences of instructions without utilizing machine learning core 345.

On-chip memory 350 may include suitable logic, circuitry, and/or code that enable storage and access of various types of data by components of SOC 305 as described herein. On-chip memory 350 may include, for example, random access memory (RAM), read-only memory (ROM), flash memory, etc. On-chip memory 350 may include multiple types of memory such as volatile memory to provide temporary workspaces for the components of SOC 305 and non-volatile memory to provide storage space that preserves data across power cycles. As suggested above, on-chip memory 350 may include a portion of secure memory for use when protected content is being processed.

Registers 355 may include suitable logic and circuitry to provide storage space for data that may be written to and read by components of SOC 305. Registers 355 may provide quicker access to smaller amounts of data than what is provided by on-chip memory 350. In addition, registers 355 may include secure registers for use when protected content is being processed.

External memory 310 may include suitable logic, circuitry, and/or code that enable storage of various types of information such as received data, generated data, code, and/or configuration information. External memory 310 may include, for example, random access memory (RAM), read-only memory (ROM), flash memory, magnetic storage, optical storage, etc. External memory 310 may include multiple types of memory such as volatile memory and non-volatile memory and, similar to on-chip memory 350, may include a portion of secure memory for use by CPE 300 when processing and presenting protected content. As depicted in FIG. 3, external memory 310 contains operating system 360 and VQM applications 365) according to aspects of the subject technology.

According to aspects of the subject technology, operating system 360 comprises a computer program having one or more sequences of instructions or code together with associated data and settings. Upon executing the instructions or code, by CPU 320 for example, one or more processes are initiated to manage the resources and operations of CPE 300 to implement the processes described herein. In addition to operation system 360, external memory 310 also may include a trusted operating system (not shown). The trusted operating system may be executed by a secure CPU in SOC 305 to manage access to secure memory and register locations and manage resources associated with executing trusted applications that may be utilized in the processing and presentation of protected content.

According to aspects of the subject technology, VQM apps 365 comprise one or more computer programs having one or more sequences of instructions or code together with associated data and settings. Upon executing the instructions or code, one or more processes may be initiated to execute quality monitoring operations described herein. VQM apps 365 may be configured to reference and utilize data generated and/or extracted during content processing, content and metadata describing the content, and data for selecting and configuring machine learning models used to generate video quality reports that may include one or more predicted presentation quality indicators including picture quality scores, processing statistics, processing errors, etc. VQM apps 365 may be configured to execute the instructions or code on one or more processors including, but not limited to, CPU 320, machine learning core 345, and video/audio codec 340. Processors used by VQM apps 365 may be dependent on factors such as execution speed, power consumption, memory resource constraints, processor availability in SOC 305, etc.

Figure 4:
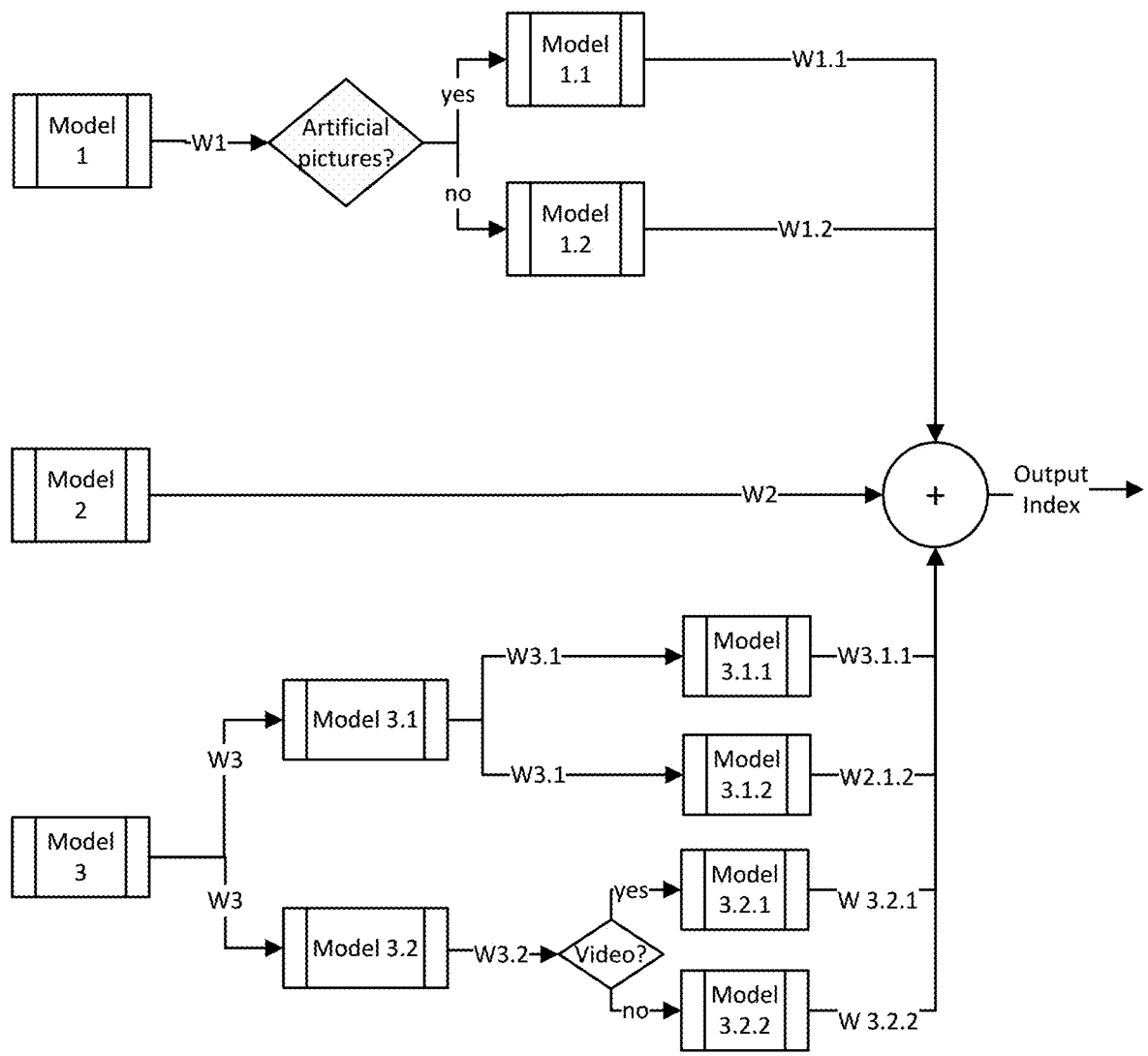
FIG. 4 is a block diagram illustrating an example integration of multiple models.

VQM apps 365 may integrate multiple models to generate a predicted presentation quality indicator according to aspects of the subject technology. Two or more of the models used by VQM apps 365 may be executed in a hierarchical order. In addition, VQM apps 365 may be configured to run the models in parallel and/or sequentially. According to aspects of the subject technology, FIG. 4 is a block diagram illustrating an example integration of multiple models. As depicted in FIG. 4, models may be connected to work in parallel and/or in sequence with the respective output results being combined with specified weighting to generate an output index (e.g., predicted presentation quality indicator). The subject technology is not limited to the number and/or arrangement of models depicted in FIG. 4 and may be implemented using other arrangements and numbers of models.

With reference to FIG. 4, models 1, 1.1, and 1.2 are connected in sequence with decision making for selecting either model 1.1 or model 1.2 depending on the output of model 1. Similar to model 1, model 3 is connected in sequence with models 3.1 and 3.2. However, both models 3.1 and 3.2 receive the weighted output of model 3 to be processed in parallel. Similarly, model 3.1 is connected in sequence with models 3.1.1 and 3.1.2 to process the weighted output of model 3.1 in parallel. Model 3.2, on the other hand, is similar to model 1 where model 3.2 is connected in sequence with decision making for selecting either model 3.2.1 or 3.2.2 based on the output of model 3.2. The weighted outputs of either model 1.1 or 1.2, model 2, model 3.1.1, model 3.1.2, and either model 3.2.1 or model 3.2.2 are combined to generate an output index including a predicted presentation quality indicator in this example.

Referring to the example arrangement depicted in FIG. 4, model 1 may be configured to process video metadata for program and channel guide information. Model 1 may predict whether the type of content being processed is artificial content (e.g., content generated using a computer) or natural scene content (e.g., images/content captured and generated using a camera). Based on the model 1 result, the system selects model 1.1 if the content is predicted to be artificial content and model 1.2 if the content is predicted to be natural scene content. In this regard, artificial content tends to have signal level differences compared to natural scene content in terms of color, texture, shape, etc. In this arrangement, model 1 processes high-level semantic data and may be a decision tree algorithm, while model 1.1 and model 1.2 may process signal-level data such as picture pixels and may be implemented using neural networks to achieve content-aware video quality prediction.

When a video transport packet is lost, the result is not necessarily visible and may not impact the user experience with respect to presenting video content. For example, lost packets may be null packets with little or no effect on the presentation of the video content. The lost packets may be Program Service Information (PSI) related packets, which are repeatedly transmitted in a transport stream. The loss of these packets has little or no effect on the presentation of the video content. Models may be configured and trained to effectively detect visibility of packet loss. According to aspects of the subject technology, model 3.2 may be an MPEG transport engine model that monitors packet Continuity Counters (CC) for packet loss and other attributes. If model 3.2 detects packet loss and the packets are video packets, video model 3.2.1 may be selected for further processing. Model 3.2.1 may be configured to detect if any frame errors occur in video decoding. Model 3.2.1 may be integrated with a video Neural Network model (model 2), which is trained to detect picture pixel artifacts like blockiness or dithering noise. If the packets are audio packets, model 3.2.2 may be selected. Model 3.2.2 may be configured to detect audio frame errors in decoding. In this example, model 3.2 may be a transport model, while model 3.2.1 and model 3.2.2 may be video and audio models, respectively, and model 2 may be a Neural Network model.

Figure 5:
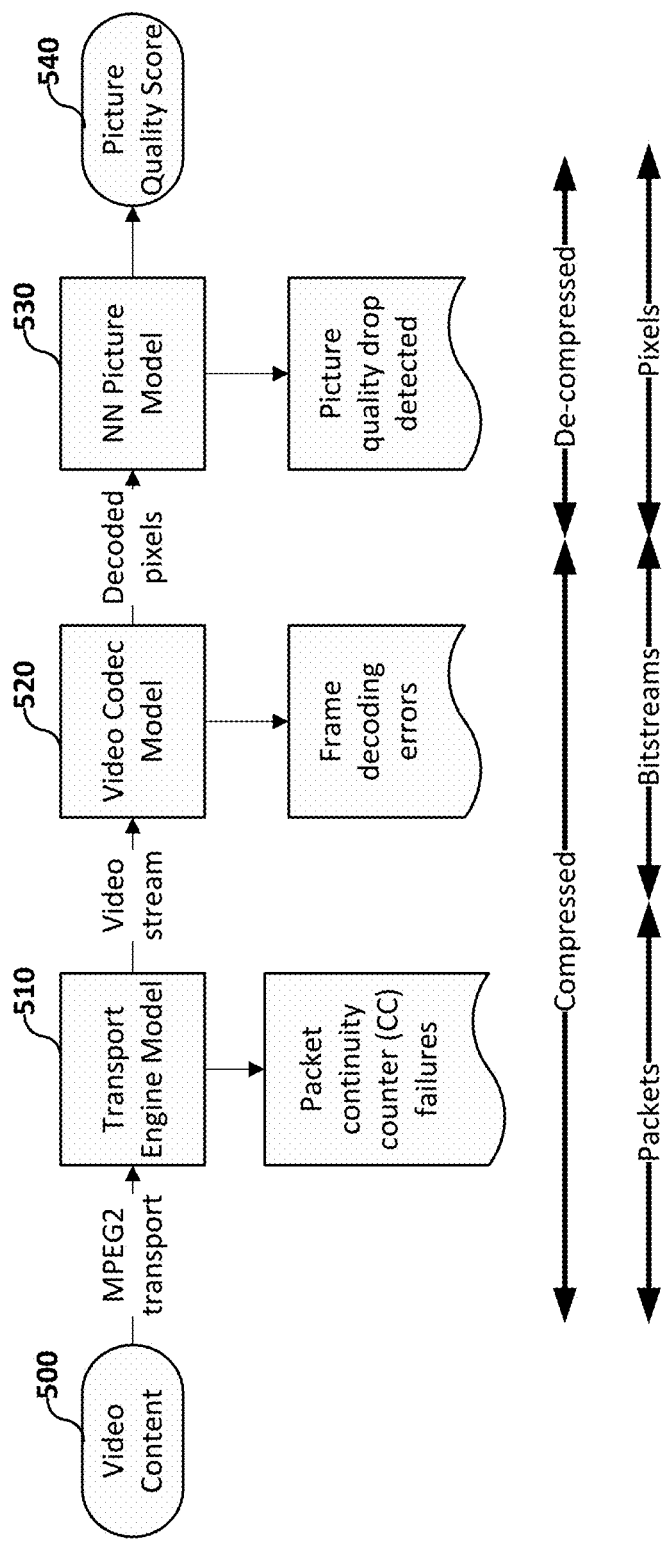
FIG. 5 is a block diagram illustrating aspects of a video presentation quality monitor according to aspects of the subject technology.

According to aspects of the subject technology, FIG. 5 is a block diagram illustrating aspects of a video presentation quality monitor. In the example represented in FIG. 5, the application of a group of models in hierarchical order is illustrated for the case of packet loss. Following the flow illustrated in FIG. 5, video content 500 may be received by a CPE. Transport engine model 510 may identify and output packet continuity counter failures indicating the loss of one or more packets observed by the transport engine when processing network packets. Video codec model 520 may identify and output an indicator of video frame decoding errors incurred while the video codec was processing the bitstream(s) containing the video content. This indicator of video frame decoding errors confirms that one or more of the lost packets were video packets. Neural network picture model 530 may detect a drop in picture quality based on identifying blocky or noisy frames in the pixel data decoded by the video codec, which further confirms that one or more of the lost packets were video packets. The video presentation quality monitor represented in FIG. 5 generates picture quality score 540 based on the outputs of the three models. Picture quality score 540 may be provided to a HE-VQM for further processing.

The example depicted in FIG. 5 illustrates the encapsulation of content in multiple layers across multiple domains. At the point of evaluation by transport engine model 510, video content 500 is encapsulated in network packets. At the point of evaluation by video codec model 520, the video content has been removed from the network packet layer and presented in one or more bitstreams. At the point of evaluation by NN picture model 530, the video content in the bitstream layer has been decoded into pixel values. In addition to these layers, the video content may exist in a compressed state when evaluated by transport engine model 510 and video codec model 520, and in a de-compressed state when evaluated by NN picture model 530. As illustrated in this brief example, the subject technology is effective at monitoring presentation quality by detecting issues present at different layers of encapsulation and different stages of processing the received video content for presentation. The data generated during the different stages of processing may be correlated across the different layers using information such as timestamps associated with the video content at the different encapsulation layers or other information that may be used to identify the portion of content encapsulated in each of the layers. In this manner, issues identified by the three models can be correlated to confirm that the issues are arising with respect to the same portion of content contained in the encapsulation layers.

Figure 6:
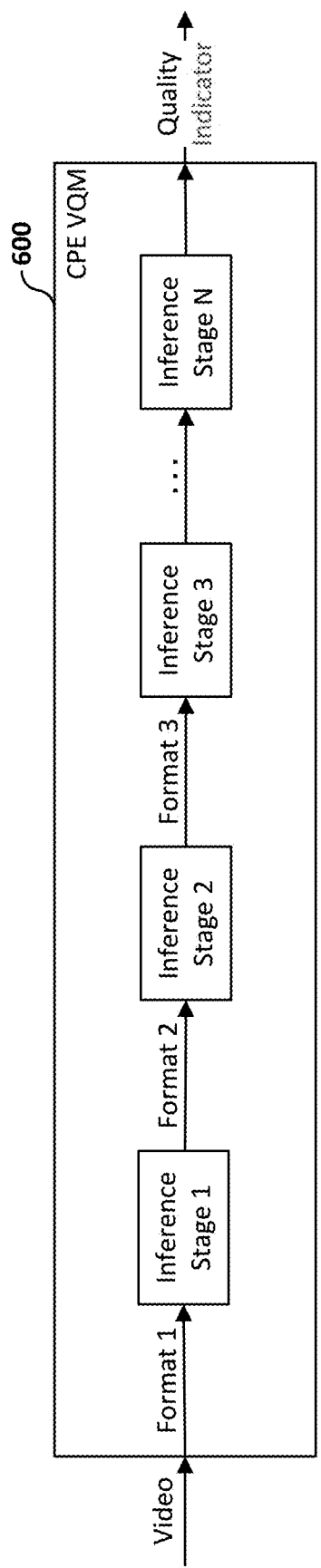
FIG. 6 is a block diagram illustrating the operations of a video presentation quality monitor system according to aspects of the subject technology.

According to aspects of the subject technology, FIG. 6 is a block diagram illustrating the operations of a video quality monitor. As depicted in FIG. 6, the operations of CPE VQM 600 include a sequence of inference stages (e.g., inference stage 1, inference stage 2, inference stage 3, . . . inference stage N) with the video content being in particular formats based on the layer of encapsulation when the individual inference stages are executed. An example of four inference stages is depicted in the block diagrams illustrated in FIGS. 7-10 according to aspects of the subject technology. For explanatory purposes, the blocks of the illustrated inference stages may be described herein as occurring in serial or linearly. However, two or more blocks of the illustrated inference stages may be performed in parallel. In addition, the blocks depicted in FIGS. 7-10 may be performed in a different order from that shown and the inference stages may not perform one or more of the illustrated blocks and/or may include one or more additional blocks.

In the examples described below with reference to FIGS. 7-10, the video content is encapsulated in multiple layers that are removed at different stages of processing the video content. For example, a first layer of encapsulation may be IP encapsulated data followed by a second layer of encapsulation by an encrypted MPEG2 transport, a third layer of encapsulation of an H.264 compressed bitstream, and finally H.264 decoded pixels. The subject technology is not limited to these standards/protocols and may be implemented for systems utilizing other standards/protocols. While not detailed in the examples below, protected video content should be stored in secure memory and register locations once the protection of the content is stripped away during processing. For example, IP encapsulated data and encrypted MPEG2 transport data need not be stored in secure memory locations. However, the decrypted data found in the H.264 compressed bitstream and the H.264 decoded pixels should be stored in secure memory locations.

According to aspects of the subject technology, the streaming processor within the SOC of a CPE may operate as a data aggregator in the VQM system. For example, the streaming processor may collect data internally from the transport engine, the video/audio codecs, etc. and store the collected data in external memory for access by the VQM apps and the machine learning models. Alternatively, the CPU may operate as the data aggregator in place of the streaming processor.

Figure 7:
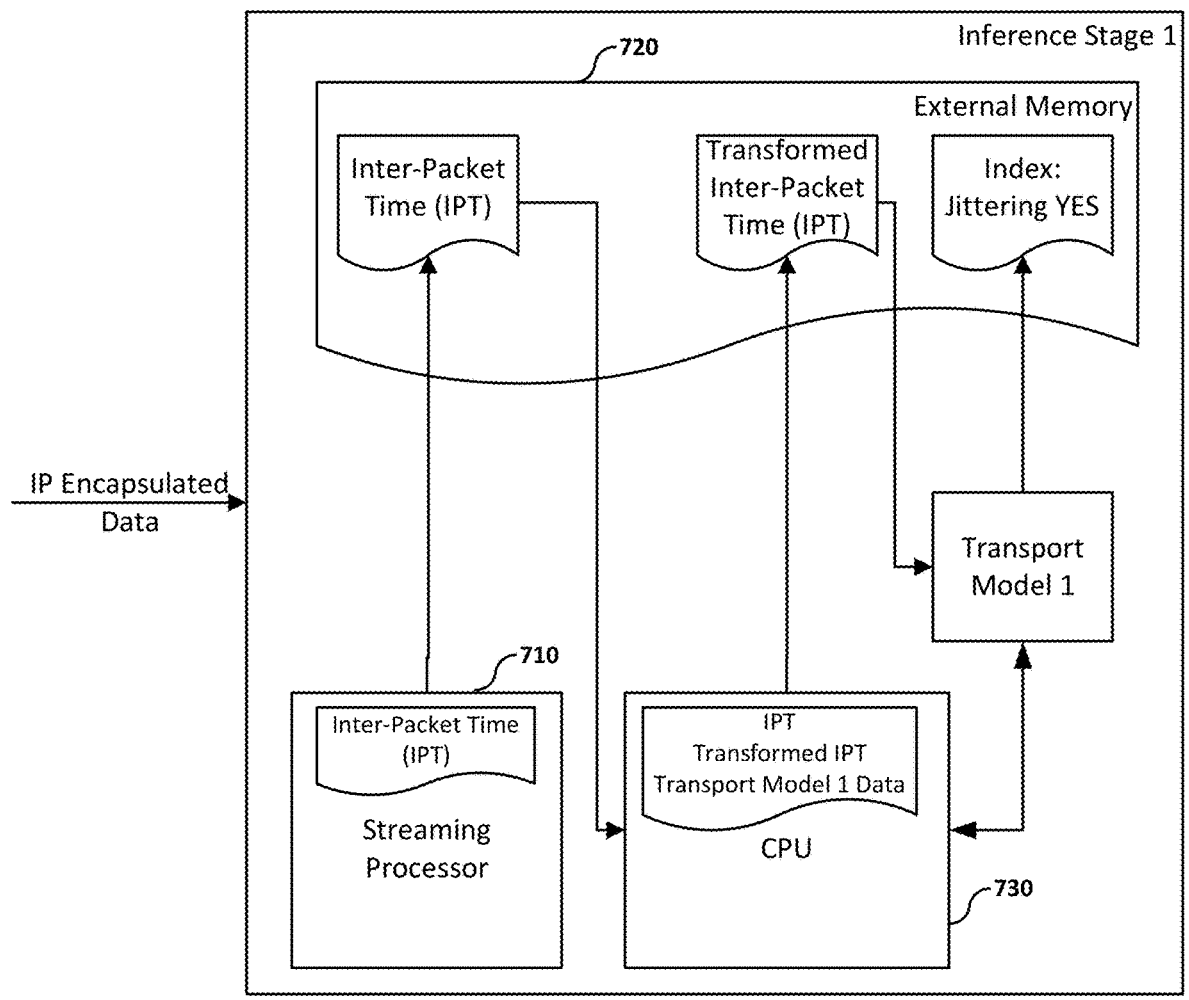
FIGS. 7-10 are block diagrams illustrating operations of a video presentation quality monitor system through a sequence of inference stages according to aspects of the subject technology.

As depicted in the example of FIG. 7, for inference stage 1 the encapsulation of the received video content is IP encapsulated data, which may contain an encrypted MPEG-2 transport stream with H.264 and AC3 encoded video and audio compressed formats. Again, the subject technology is not limited to these or any particular standards/protocols and may be implemented for systems using other standards/protocols for the communication and presentation of video and audio content. The measurements performed by transport model 1 are feature extractions, including but not limited to IP inter-packet arrival times (IPT) assisted by streaming processor 710, which outputs a series of temporal domain IPT data to external memory 720. During the measurements, streaming processor 710 may store the intermediate measurements in internal on-chip memories for faster processing. At the completion of the measurements, streaming processor 710 stores the final IPT time series data to external memory 720.

CPU 730 may transform the IPT time series into the frequency domain, specifically into frequencies of packet arrival periodicities. CPU 730 may transfer the IPT time series data into internal memory for faster processing. After completing the transform, CPU 730 may store the transformed IPT data into external memory 720. Transport model 1 configured with transport model 1 data by CPU 730 may be configured to detect network jittering by correlating the transformed IPT data over a period of time. The index output from transport model 1 may be a binary classification indicating whether jittering is detected.

Figure 8:
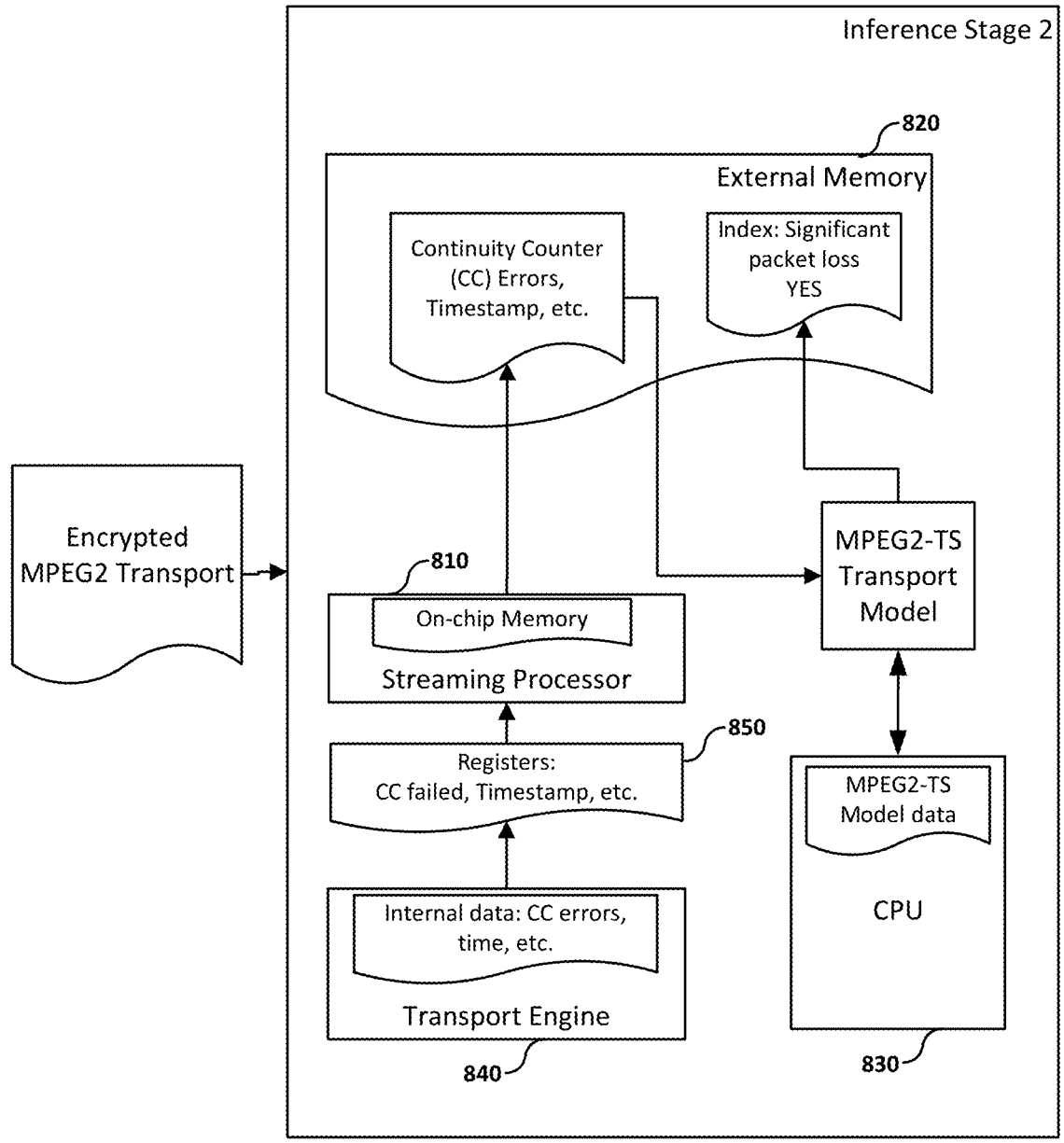

As depicted in the example of FIG. 8, transport engine 840 may be configured to process the input encrypted MPEG2 transport data to perform measurements of multiple transport characteristics, which include but are not limited to packet continuity reflected in continuity counter (CC) errors and others. A packet continuity counter (CC) circuit in transport engine 840 may process input data in its own internal memory (secure) and detect if counter discontinuity occurs. If counter discontinuity is detected, transport engine 840 may set associated registers 850 (secure) on-chip. Streaming processor 810 may read the registers set by transport engine 840 and store the CC and other transport information, together with associated temporal domain information such as timestamps, in on-chip secure memory. After any formatting or additional processing, streaming processor 810 prepares the final transport engine data in a defined structure and stores the data to external secure memory 820.

The MPEG2-TS transport model may be executed on CPU 830. The model may be configured to read the data stored by streaming processor 810 from external memory 820 and determine additional MPEG2 transport metrics. The intermediate model data, inputs, and outputs may be stored in secure memory on chip on CPU 830. The model procedure detects and classifies if the detected packet loss is significant and outputs an index indicating whether packet loss is significant to external memory 820. In other examples, the model may predict the impact of a packet loss such as loss visibility jointly with the codec model.

Figure 9:
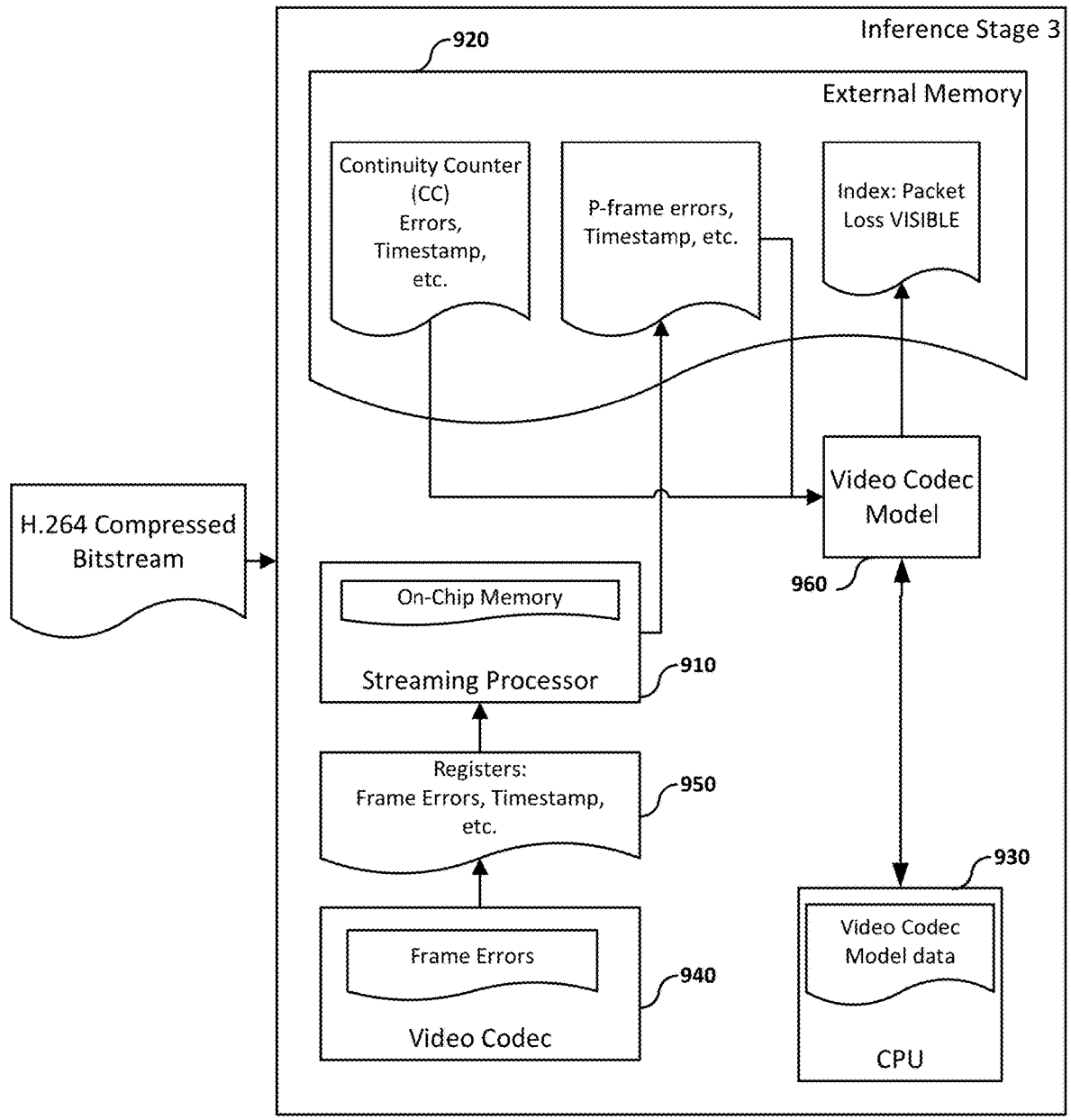

As depicted in the example of FIG. 9, video codec 940 may be configured to process the H.264 compressed bitstream video input, and perform measurements such as decoding speed, latency, error statistics, etc. during processing. Video codec 940 detects if frame decoding errors occur based on the measurements using the on-chip secure memory for data processing if necessary. Video codec 940 may set associated secure registers indicating the detected frame errors and other video data. Streaming processor 910 may read out the data related to the detected frame decoding errors and store the data and other information in its on-chip secure memory for processing. After processing, streaming processor 910 may prepare the final video codec data, including frame errors, time stamp, etc., in a data structure and store the data structure to external memory 920.

Video codec model 960 may be executed on CPU 830. Video codec model 960 may read the data stored in external memory by the streaming processor in the current inference stages as well as previous inference stages and capture video metrics (e.g., H.264 video metrics). Intermediate model data, inputs, and outputs may be stored in the secure memory on chip of CPU 930. The model procedure detects and classifies if the packet loss detected or measured by the transport engine is confirmed by decoding errors and are likely visible. In this case, the video codec module model 960 prediction output video codec model 960 is an index if packet loss is visible.

Figure 10:
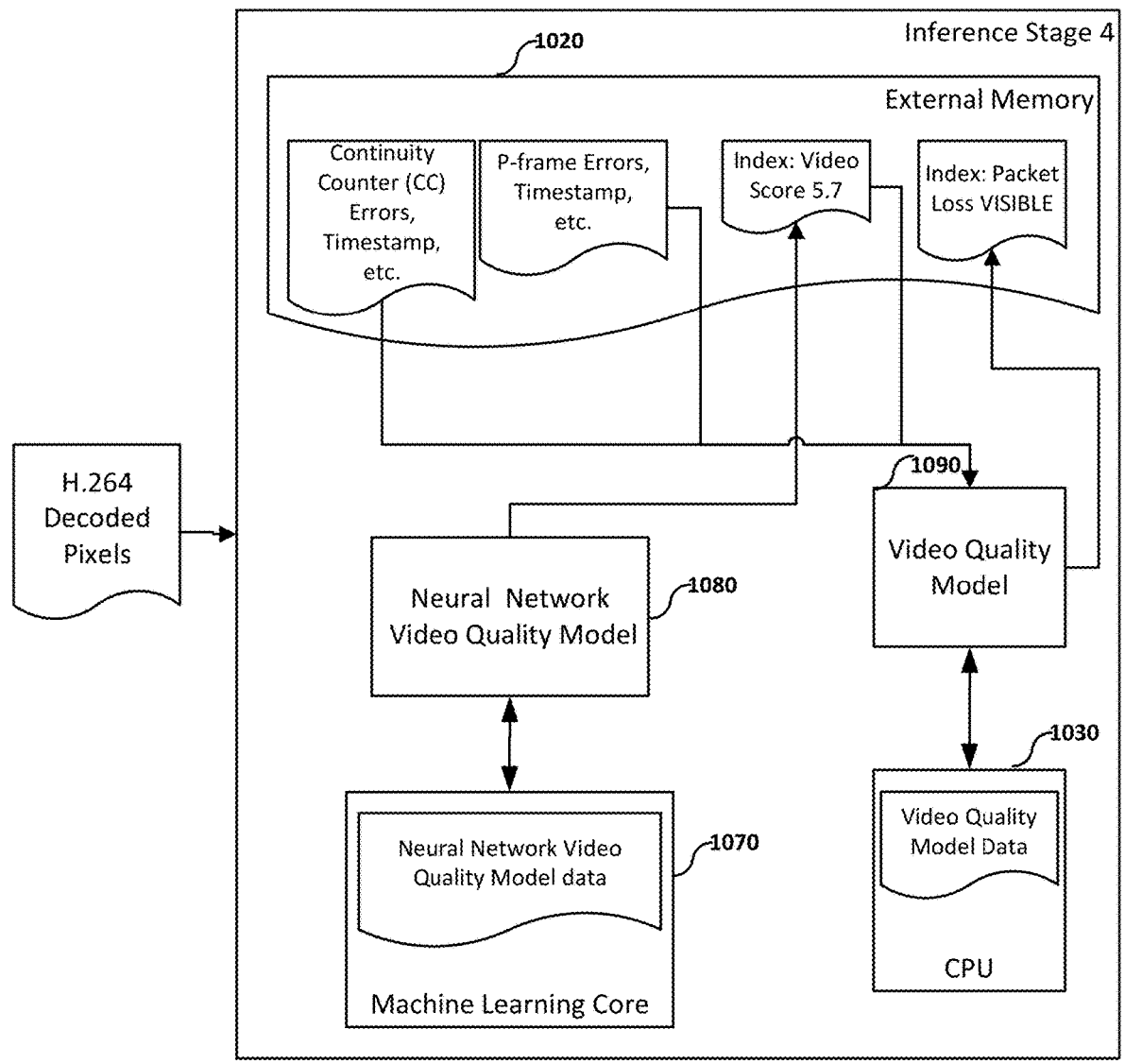

As depicted in the example of FIG. 10, inference stage 4 is configured to process H.264 decoded pixels. For example, machine learning core 1070 may be configured to process the H.264 decoded pixels to perform measurements such as feature extractions of video attributes such as noise, artificial boundaries, etc. Machine learning core 1070 may be configured to use internal memory to store the data regarding the feature extractions and model data for configuring the neural network (NN) video quality model 1080. NN video quality model 1080 may be configured to predict a video quality score based on the extracted video attributes and store the predicted video quality score in external memory 1020.

According to aspects of the subject technology, the predicted video score may be the output index of NN video quality model 1080. Alternatively, or in addition to the predicted video score, video quality model 1090 may be executed on CPU 1030 to take data measured and stored during previous inference stages as inputs to perform a joint inference in which packet loss data from inference stage 2, decoding error data from inference stage 3, and the predicted video score generated in inference stage 4 are used to jointly verify or confirm that the detected packet loss is visible to a user observing the presentation of the conent.

According to aspects of the subject technology, the HE-VQM may include one or more of the same machine learning models as incorporated in the CPE-VQMs of the CPE devices thereby allowing the HE-VQM to replicate the analysis of video content done by the CPE devices. The HE-VQM may have easier access to original or reference content being delivered across the network by the video server. In some implementations, the HE-VQM may execute portions or all of the monitoring and analysis performed by a CPE-VQM on the original or reference content to generate an expected presentation quality score. The HE-VQM may provide the expected presentation quality score to the video server to include in the metadata transmitted with video content to the CPE devices. Using the results generated by the HE-VQM, the CPE-VQM may compare its generated results against those provided from the HE-VQM to evaluate whether any issues found in the content presentation are inherent in the original or reference content. If the issues are inherent, the CPE-VQM may not notify the HE-VQM of its results.

According to aspects of the subject technology, a CPE may be configured to verify or confirm issues predicted for the content being presented directly with the user of the CPE. For example, when the CPE-VQM identifies a possible visible issue with the presentation of the content the CPE may provide a prompt to a user viewing the content requesting confirmation of the possible visible issue. The prompt may be a visual prompt placed on a screen on which the content is being viewed, and/or may be an audio prompt with text-to-speech technology played through speakers of the device being used to view the content. The view user may respond to the prompt to either confirm or deny the existence of the possible visible issue in the presentation of the content. The response may be made using any of a number of mechanisms including user interfaces including, but not limited to, user-voice confirmation with automatic speech recognition, gestures, etc., on the CPE or the device on which the content is being presented. The system may defer or cancel sending a video quality report to the HE-VQM if the user denies the existence of the possible visible issues with the presentation of the content.

Figure 11:
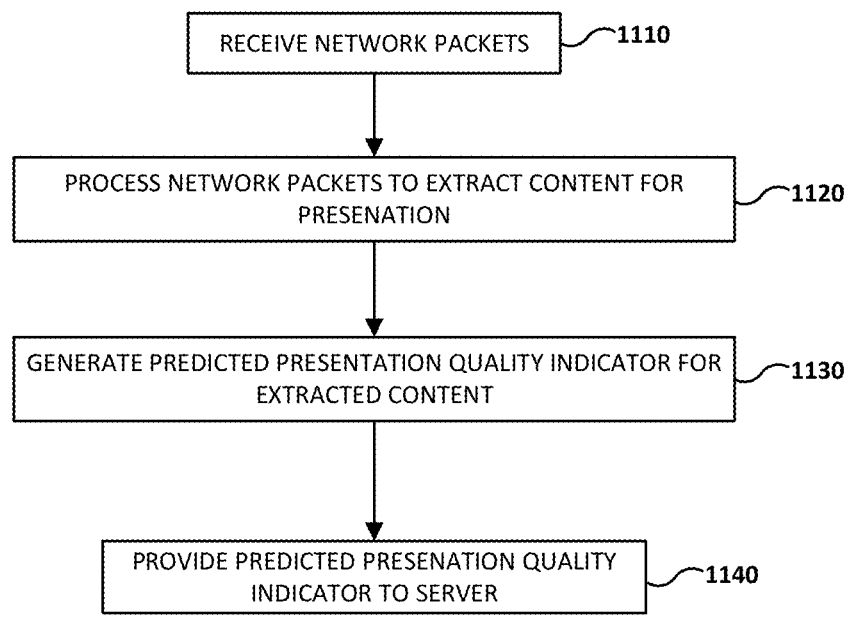
FIG. 11 is a flowchart depicting an example process monitoring the quality of video content according to aspects of the subject technology.

FIG. 11 is a flowchart depicting an example process monitoring the quality of video content according to aspects of the subject technology. For explanatory purposes, the blocks of the illustrated process may be described herein as occurring in serial or linearly. However, two or more blocks of the illustrated process may be performed in parallel. In addition, the blocks depicted in FIG. 11 may be performed in a different order from that shown and the process may not perform one or more of the illustrated blocks and/or may include one or more additional blocks.

According to aspects of the subject technology, process 1100 includes receiving multiple network packets containing content encapsulated in multiple layers (block 1110). The network packets may be received by a CPE device such as a set-top box, for example. The network packets may be processed to extract the encapsulated content for presentation (block 1120). The content may include video data, audio data, etc. A predicted presentation quality indicator may be generated for the extracted content using machine learning models in a hierarchical order with data generated during the processing of the network packets (block 1130). The predicted presentation quality indicator may be provided to a server such as a HE-VQM for further processing (block 1140).

Figure 12:
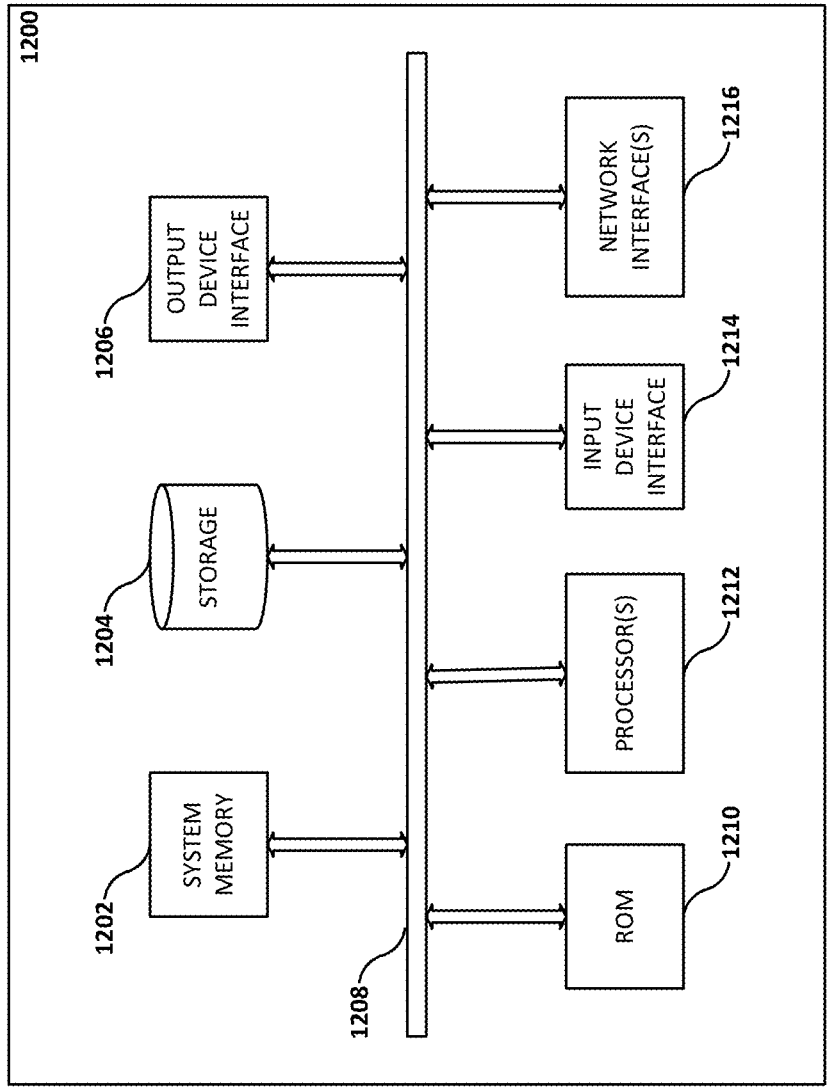
FIG. 12 is a block diagram illustrating an electronic system with which aspects of the subject technology may be implemented.

FIG. 12 conceptually illustrates an electronic system 1200 with which one or more implementations of the subject technology may be implemented. Not all of the depicted components may be required, however, and one or more implementations may include additional components not shown in the figure. Variations in the arrangement and type of the components may be made without departing from the spirit or scope of the claims as set forth herein. Depicted or described connections and couplings between components (including electrical and communicative connections and couplings) are not limited to direct connections or direct couplings and may be implemented with one or more intervening components unless expressly stated otherwise.

Electronic system 1200, for example, can be an HE-VQM or a video server as described above. Such an electronic system 1200 includes various types of computer readable media and interfaces for various other types of computer readable media. The electronic system 1200 includes a bus 1208, one or more processing unit(s) 1212, a system memory 1204, a read-only memory (ROM) 1210, a permanent storage device 1202, an input device interface 1214, an output device interface 1206, and a network interface 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processing unit(s) 1212 with the ROM 1210, the system memory 1204, and the permanent storage device 1202. From these various memory units, the one or more processing unit(s) 1212 retrieves instructions to execute and data to process in order to execute the processes of the subject disclosure. The one or more processing unit(s) 1212 can be a single processor or a multicore processor in different implementations.

The ROM 1210 stores static data and instructions that are needed by the one or more processing unit(s) 1212 and other modules of the electronic system. The permanent storage device 1202, on the other hand, is a read-and-write memory device. The permanent storage device 1202 is a non-volatile memory unit that stores instructions and data even when the electronic system 1200 is off. One or more implementations of the subject disclosure use a mass-storage device (such as a solid-state drive, or a magnetic or optical disk and its corresponding disk drive) as the permanent storage device 1202.

Other implementations use a removable storage device (such as a flash memory drive, optical disk and its corresponding disk drive, external magnetic hard drive, etc.) as the permanent storage device 1202. Like the permanent storage device 1202, the system memory 1204 is a read-and-write memory device. However, unlike the permanent storage device 1202, the system memory 1204 is a volatile read-and-write memory, such as random-access memory. System memory 1204 stores any of the instructions and data that the one or more processing unit(s) 1212 needs at runtime. In one or more implementations, the processes of the subject disclosure are stored in the system memory 1204, the permanent storage device 1202, and/or the ROM 1210. From these various memory units, the one or more processing unit(s) 1212 retrieves instructions to execute and data to process in order to execute the processes of one or more implementations.

The bus 1208 also connects to the input device interface 1214 and the output device interface 1206. The input device interface 1214 enables a user to communicate information and select commands to the electronic system. Input devices used with the input device interface 1214 include, for example, alphanumeric keyboards and pointing devices (also called "cursor control devices"). The output device interface 1206 enables, for example, the display of images generated by the electronic system 1200. Output devices used with the output device interface 1206 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 1208 also couples the electronic system 1200 to one or more networks (not shown) through one or more network interfaces 1216. In this manner, the computer can be a part of one or more network of computers (such as a local area network (LAN), a wide area network (WAN), or an Intranet, or a network of networks, such as the Internet). Any or all components of the electronic system 1200 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multicore processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

According to aspects of the subject technology, a device is provided that includes computer-readable storage media storing one or more sequences of instructions; and processing circuitry configured to execute the one or more sequences of instructions to: receive a plurality of network packets containing content encapsulated in a plurality of layers; process the received plurality of network packets to extract the content for presentation; generate a predicted presentation quality indicator for the extracted content using a plurality of machine learning models in a hierarchical order with data generated during processing of the received plurality of network packets used as inputs to the plurality of machine learning models; and provide the predicted presentation quality indicator for the extracted content to a server via a network, wherein the data generated during processing of the received plurality of network packets is correlated across the plurality of layers to generate the predicted presentation quality indicator.

The machine learning models of the plurality of machine learning models may be associated with respective layers of the plurality of layers. The data used as inputs to the plurality of machine learning models may be from a plurality of different domains each corresponding to one or more layers of the plurality of layers. The different domains may include at least one of a packet-level domain, a bitstream-level domain, or a symbol-level domain. The output data generated by at least one of the plurality of machine learning models may be provided as input data to another one of the plurality of machine learning models.

The content may include at least one of audio content or video content. The received plurality of network packets may further contain an expected presentation quality indicator, and providing the predicted presentation quality score to the server may be based on a comparison of the expected presentation quality score and the predicted presentation quality score. The processing circuitry may be further configured to: provide a prompt to confirm the predicted presentation quality indicator for presentation to a user; and receive a user response to the prompt, wherein providing the predicted presentation quality indicator to the server is based on the user response to the prompt. The prompt may include at least one of an audio prompt or a video prompt. The processing circuitry may include at least one of a transport engine, a streaming processor, a codec, and a machine learning core.

According to aspects of the subject technology, a method is provided that includes: receiving a plurality of network packets containing content encapsulated in a plurality of layers; processing the received plurality of network packets to extract the content for presentation; generating a predicted presentation quality indicator for the extracted content using a plurality of machine learning models in a hierarchical order with data generated during processing of the received plurality of network packets used as inputs to the plurality of machine learning models; and providing the predicted presentation quality indicator for the extracted content to a server via a network, wherein the machine learning models of the plurality of machine learning models are associated with respective layers of the plurality of layers, and wherein the data generated during processing of the received plurality of network packets is correlated across the plurality of layers to generate the predicted presentation quality indicator.

The data used as inputs to the plurality of machine learning models may be from a plurality of different domains each corresponding to one or more layers of the plurality of layers, and wherein the different domains may comprise at least one of a packet-level domain, a bitstream-level domain, or a symbol-level domain. The method may further include providing an output generated by at least one of the plurality of machine learning models as the input to another one of the plurality of machine learning models.

The received plurality of network packets further may further contain an expected presentation quality indicator, and the predicted presentation quality score to the server may be based on a comparison of the expected presentation quality score and the predicted presentation quality score. The method may further include: providing a prompt to confirm the predicted presentation quality indicator for presentation to a user; and receiving a user response to the prompt, wherein providing the predicted presentation quality indicator to the server is based on the user response to the prompt.

According to aspects of the subject technology, a system is provided that includes a server; and a plurality of edge devices configured to communicate with the server via a network. Each edge device of the plurality of edge devices includes: computer-readable storage media storing one or more sequences of instructions; and processing circuitry configured to execute the one or more sequences of instructions to: receive a plurality of network packets containing content encapsulated in a plurality of layers; process the received plurality of network packets to extract the content for presentation; generate a predicted presentation quality indicator for the extracted content using a plurality of machine learning models in a hierarchical order with data generated during processing of the received plurality of network packets used as inputs to the plurality of machine learning models; and provide the predicted presentation quality indicator for the extracted content to the server via the network, wherein the data generated during processing of the received plurality of network packets is correlated across the plurality of layers to generate the predicted presentation quality indicator, wherein the server is configured to correlate the predicted presentation quality indicators provided by the plurality of edge devices to evaluate the system.

The machine learning models of the plurality of machine learning models may be associated with respective layers of the plurality of layers, and wherein the data used as inputs to the plurality of machine learning models may be from a plurality of different domains each corresponding to one or more layers of the plurality of layers. The output data generated by at least one of the plurality of machine learning models may be provided as input data to another one of the plurality of machine learning models. The server may be configured to: generate an expected presentation quality indicator for the content based on an original source of the content, wherein the plurality of network packets received by the plurality of edge devices further contains the expected presentation quality indicator generated by the server, and wherein providing the predicted presentation quality score to the server is based on a comparison of the expected presentation quality score and the predicted presentation quality score. The processing circuitry of the plurality of edge devices may be further configured to: provide a prompt to confirm the predicted presentation quality indicator for presentation to a user; and receive a user response to the prompt, wherein providing the predicted presentation quality indicator to the server is based on the user response to the prompt.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A device, comprising:
   computer-readable storage media storing one or more sequences of instructions; and
   processing circuitry configured to execute the one or more sequences of instructions to:
   receive a plurality of network packets containing content encapsulated in a plurality of layers;
   process the received plurality of network packets to extract the content for presentation;
   generate a predicted presentation quality indicator for the extracted content using a plurality of machine learning models in a hierarchical order with data generated during processing of the received plurality of network packets used as inputs to the plurality of machine learning models; and
   provide the predicted presentation quality indicator for the extracted content to a server via a network,
   wherein the data generated during processing of the received plurality of network packets is correlated across the plurality of layers to generate the predicted presentation quality indicator.

2. The device of claim 1, wherein the machine learning models of the plurality of machine learning models are associated with respective layers of the plurality of layers.

3. The device of claim 2, wherein the data used as inputs to the plurality of machine learning models is from a plurality of different domains each corresponding to one or more layers of the plurality of layers.

4. The device of claim 3, wherein the different domains comprise at least one of a packet-level domain, a bitstream-level domain, or a symbol-level domain.

5. The device of claim 3, wherein output data generated by at least one of the plurality of machine learning models is provided as input data to another one of the plurality of machine learning models.

6. The device of claim 1, wherein the content comprises at least one of audio content or video content.

7. The device of claim 1, wherein the received plurality of network packets further contains an expected presentation quality indicator, and
   wherein providing the predicted presentation quality score to the server is based on a comparison of the expected presentation quality score and the predicted presentation quality score.

8. The device of claim 1, wherein the processing circuitry is further configured to:
   provide a prompt to confirm the predicted presentation quality indicator for presentation to a user; and
   receive a user response to the prompt,
   wherein providing the predicted presentation quality indicator to the server is based on the user response to the prompt.

9. The device of claim 8, wherein the prompt comprises at least one of an audio prompt or a video prompt.

10. The device of claim 1, wherein the processing circuitry comprises at least one of a transport engine, a streaming processor, a codec, and a machine learning core.

11. A method, comprising:
    receiving a plurality of network packets containing content encapsulated in a plurality of layers;
    processing the received plurality of network packets to extract the content for presentation;
    generating a predicted presentation quality indicator for the extracted content using a plurality of machine learning models in a hierarchical order with data generated during processing of the received plurality of network packets used as inputs to the plurality of machine learning models; and
    providing the predicted presentation quality indicator for the extracted content to a server via a network,
    wherein the machine learning models of the plurality of machine learning models are associated with respective layers of the plurality of layers, and
    wherein the data generated during processing of the received plurality of network packets is correlated across the plurality of layers to generate the predicted presentation quality indicator.

12. The method of claim 11, wherein the data used as inputs to the plurality of machine learning models is from a plurality of different domains each corresponding to one or more layers of the plurality of layers, and
    wherein the different domains comprise at least one of a packet-level domain, a bitstream-level domain, or a symbol-level domain.

13. The method of claim 11, further comprising providing an output generated by at least one of the plurality of machine learning models as the input to another one of the plurality of machine learning models.

14. The method of claim 11, wherein the received plurality of network packets further contains an expected presentation quality indicator, and wherein providing the predicted presentation quality score to the server is based on a comparison of the expected presentation quality score and the predicted presentation quality score.

15. The method of claim 11, further comprising:
providing a prompt to confirm the predicted presentation quality indicator for presentation to a user; and
receiving a user response to the prompt,
wherein providing the predicted presentation quality indicator to the server is based on the user response to the prompt.

16. A system, comprising:
a server; and
a plurality of edge devices configured to communicate with the server via a network, wherein each edge device of the plurality of edge devices comprises:
computer-readable storage media storing one or more sequences of instructions; and
processing circuitry configured to execute the one or more sequences of instructions to:
receive a plurality of network packets containing content encapsulated in a plurality of layers;
process the received plurality of network packets to extract the content for presentation;
generate a predicted presentation quality indicator for the extracted content using a plurality of machine learning models in a hierarchical order with data generated during processing of the received plurality of network packets used as inputs to the plurality of machine learning models; and
provide the predicted presentation quality indicator for the extracted content to the server via the network,
wherein the data generated during processing of the received plurality of network packets is correlated across the plurality of layers to generate the predicted presentation quality indicator,
wherein the server is configured to correlate the predicted presentation quality indicators provided by the plurality of edge devices to evaluate the system.

17. The system of claim 16, wherein the machine learning models of the plurality of machine learning models are associated with respective layers of the plurality of layers, and
wherein the data used as inputs to the plurality of machine learning models is from a plurality of different domains each corresponding to one or more layers of the plurality of layers.

18. The system of claim 17, wherein output data generated by at least one of the plurality of machine learning models is provided as input data to another one of the plurality of machine learning models.

19. The system of claim 18, wherein the server is configured to:
generate an expected presentation quality indicator for the content based on an original source of the content,
wherein the plurality of network packets received by the plurality of edge devices further contains the expected presentation quality indicator generated by the server, and
wherein providing the predicted presentation quality score to the server is based on a comparison of the expected presentation quality score and the predicted presentation quality score.

20. The system of claim 16, wherein the processing circuitry of the plurality of edge devices is further configured to:
provide a prompt to confirm the predicted presentation quality indicator for presentation to a user; and
receive a user response to the prompt,
wherein providing the predicted presentation quality indicator to the server is based on the user response to the prompt.

\* \* \* \* \*